US012725501B2

(12) United States Patent
Lim et al.

(10) Patent No.: US 12,725,501 B2
(45) Date of Patent: Sep. 1, 2026

(54) ANALYTIC TRIGGER CUSTOMIZATION FOR AMBIENT LISTENING AND EVIDENCE COLLECTION

(71) Applicant: MOTOROLA SOLUTIONS, INC., Chicago, IL (US)

(72) Inventors: Bing Qin Lim, Bayan Lepas (MY); Jin Hoe Phua, Bayan Lepas (MY); Chun Meng Tan, Bayan Lepas (MY); Woei Chyuan Tan, Bayan Lepas (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 155 days.

(21) Appl. No.: 18/917,782

(22) Filed: Oct. 16, 2024

(65) Prior Publication Data

US 2026/0105825 A1 Apr. 16, 2026

(51) Int. Cl.
*G08B 21/02* (2006.01)

(52) U.S. Cl.
CPC .................................... *G08B 21/02* (2013.01)

(58) Field of Classification Search
CPC ...... G06Q 50/265; G06V 20/52; G06V 20/53; G06V 40/172; G06V 20/20; G06V 20/44; G06V 20/41; G10L 15/1822; G10L 21/0208; G10L 25/51; H04R 1/406; H04L 63/1416; G08B 21/02; G08B 13/19669; G08B 23/00; G08B 25/016; G08B 27/001; G02B 2027/0138
USPC ..................................... 340/573.1; 455/404.1
See application file for complete search history.

(56) References Cited

U.S. PATENT DOCUMENTS

| | | | | |
|---|---|---|---|---|
| 8,472,915 | B2 * | 6/2013 | DiPerna | H04M 1/21 455/575.1 |
| 10,313,144 | B2 * | 6/2019 | Franks | H04L 12/1895 |
| 10,477,008 | B2 * | 11/2019 | Cohen | G08B 25/009 |
| 10,733,860 | B1 * | 8/2020 | Jondu | H04L 12/2803 |
| 10,825,332 | B2 | 11/2020 | Kleve et al. | |
| 11,495,119 | B1 | 11/2022 | Lim et al. | |
| 11,528,354 | B2 * | 12/2022 | Cohen | H04W 4/029 |
| 11,747,859 | B2 * | 9/2023 | Nirgudkar | G01S 17/93 348/143 |

(Continued)

FOREIGN PATENT DOCUMENTS

| | | | |
|---|---|---|---|
| AU | 2019222843 | B2 | 4/2021 |
| JP | 6876379 | B2 | 5/2021 |

*Primary Examiner* — Eric Blount
(74) *Attorney, Agent, or Firm* — Michael Best & Friedrich LLP

(57) ABSTRACT

A device including: a memory and an electronic processor configured to retrieve, from the memory, executable instructions that, when executed by the electronic processor, cause the electronic processor to: receive a first set of monitoring data associated with a user of a mobile device; detect, based on the first set of monitoring data, a first instance of a potential threat to the user; responsive to detecting the first instance, cause a suggestion to be presented to the user to enable a trigger associated with the potential threat; receive an input from the user responsive to the suggestion including a selected trigger; receive a second set of monitoring data associated with the user; responsive to detecting a second instance of the potential threat to the user based on the selected trigger and the second set of monitoring data, control an ambient listening function on the mobile device based on the input.

20 Claims, 6 Drawing Sheets

(56) References Cited

U.S. PATENT DOCUMENTS

2014/0304341 A1* 10/2014 Hsu ........................ H04L 51/08
709/206
2014/0365574 A1* 12/2014 Franks ................ H04L 12/1895
709/204
2023/0362610 A1* 11/2023 Bradley .................. H04W 4/90
2024/0221733 A1* 7/2024 King .................. G10L 21/0208
2025/0369729 A1* 12/2025 Abhyanker ............... F41H 1/00

* cited by examiner

ANALYTIC TRIGGER CUSTOMIZATION FOR AMBIENT LISTENING AND EVIDENCE COLLECTION

BACKGROUND OF THE INVENTION

Universities and other educational institutions may use video, audio, and other monitoring systems to secure their campuses. In some instances, electronic devices carried by students (e.g., smart telephones) may be configured to collect and submit data for use in deterring (and even prosecuting) prohibited behavior against the students.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments, examples, aspects, and features of concepts that include the claimed subject matter and explain various principles and advantages of those embodiments, examples, aspects, and features.

Figure 1:
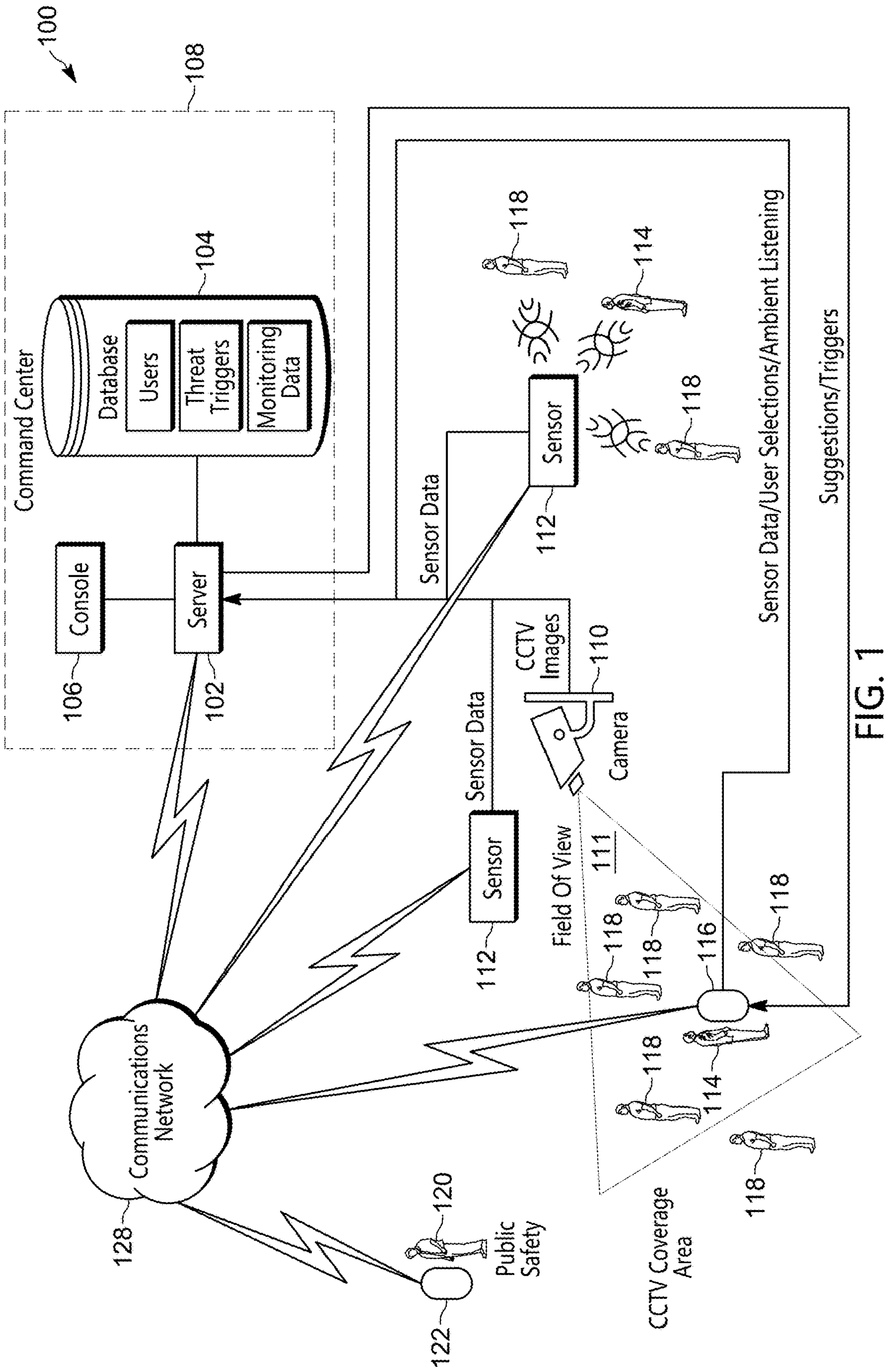
FIG. 1 illustrates a campus security system according to some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of examples, aspects, and features illustrated.

In some instances, the apparatus and method components have been represented where appropriate by conventional symbols in the drawings, showing only those specific details that are pertinent to understanding the of various embodiments, examples, aspects, and features so as not to obscure the disclosure with details that will be readily apparent to those of ordinary skill in the art having the benefit of the description herein.

DETAILED DESCRIPTION OF THE INVENTION

On educational campuses, many people gather or pass through areas, making it difficult to monitor all activities occurring within the campus. For example, some people on a campus may be seeking to cause harm to other people. For example, bullying and domestic violence are pressing issues that may go unreported due to victims' lack of evidence or fear of compromising their privacy. In educational institutions, many incidents remain unaddressed because potential witnesses or victims hesitate to intervene or report due to the absence of concrete proof.

Electronic devices, such as smart telephones, carried by students are capable of ambient listening features, which could monitor and/or record conversations to detect and prevent threats or to generate evidence for use in providing and prosecuting incidents of bullying, domestic violence, and the like. However, constant activation of such features may infringe upon students' privacy rights and create resistance, especially when the likelihood of an incident seems low. In addition, students often adopt a mindset of presuming their safety and may be reluctant to trade off their privacy for potential protection. To balance privacy concerns and safety needs, it is desirable to selectively activate ambient listening. However, a victim may not be able to do so when an incident occurs.

One possible solution to this problem is activating ambient listening features automatically based on trigger analytics. However, setting broad trigger analytics may result in excessive false alarms, causing user resistance or even system abandonment due to alert fatigue. Moreover, security personnel might become desensitized or deliberately ignore alerts if the false alarm rate is too high, whether due to unintentional triggers or malicious actors testing the system. However, providing a large number of triggers for users to choose from may paradoxically discourage them from enabling any, as they struggle to determine which triggers are most pertinent and worth the privacy trade-off.

To address, among other things, these problems, systems and methods are provided herein for automatically activating ambient listening features automatically based on analytic trigger options tailored to users' specific needs and environments.

Embodiments and aspects described herein provide an adaptive system that monitors the student's environment for potential danger signals, learning their daily routines and habits to better understand what's normal and what might be cause for concern.

The system is therefore able to detect situations that are out of the ordinary for that student and pose a potential threat. For example, as a student walks through the school corridors, the system may analyze a closed-circuit television (CCTV) feed and detect an unusual gathering of students (e.g., a group that rarely hangs out together, and some of whom may be known bad actors). The system flags this behavior as potentially indicative of a threat. Other sensor data may also be used to detect potential threats. For example, the system may receive data from phone sensors, occupancy sensors, sound sensors, noise sensors, movement sensors, radar sensors, and the like. For example, a specialized noise sensor may detect an unusually high toilet sink usage at the same time as the student is present in the restroom (e.g., after having been observed on CCTV being ushered into the restroom), suggesting someone might be trying to create a distracting noise background—another red flag for possible bullying. These examples are scenarios that are suspicious enough (exceeding threshold for suspicion) but not enough to reach the threshold of triggering red flags for action (e.g. capture the bad actor) from security personnel.

Based on the detected anomalies, the system sends the student's smart telephone a notification with personalized suggestions for enabling analytic triggers to activate ambient listening when similar situations occur in the future. For example, a suggestion might allow the student to agree to activate ambient listening when the same group of individuals approaches the student in the future. These tailored recommendations empower the student to make an informed decision about their privacy without feeling overwhelmed by the extensive list of available analytics.

Using such embodiments, the student is more aware of the potential threats, and has the option to enable the suggested triggers that are tailored to them based on potential threats that they have experienced. In the event that the potential threat was a false positive, the student has the option to indicate that to the system. The system can proactively monitor for these specific scenarios chosen by the student and activate ambient listening automatically if they occur again, ensuring the student has the necessary evidence to prove bullying or other harmful activity against him or her. This adaptive approach respects users' reluctance to compromise their privacy while still offering valuable safeguards when potential danger presents itself. By providing personalized analytic trigger suggestions based on real-world context and learned user behavior, the system helps students strike a balance between privacy and safety, even when they are not actively seeking protection.

In some aspects, the techniques described herein relate to a computing device including: a memory; and an electronic processor coupled to the memory; wherein the electronic processor is configured to retrieve, from the memory, executable instructions that, when executed by the electronic processor, cause the electronic processor to: receive a first set of monitoring data associated with a user of a mobile device; detect, based on the first set of monitoring data, a first instance of a potential threat to the user; responsive to detecting the first instance, cause a suggestion to be presented to the user to enable a trigger associated with the potential threat; receive an input from the user responsive to the suggestion including a selected trigger; receive a second set of monitoring data associated with the user; responsive to detecting a second instance of the potential threat to the user based on the selected trigger and the second set of monitoring data, control an ambient listening function on the mobile device based on the input.

In some aspects, the techniques described herein relate to a method including: receiving a first set of monitoring data associated with a user of a mobile device; detecting, based on the first set of monitoring data, a first instance of a potential threat to the user; responsive to detecting the first instance, presenting a suggestion to the user to enable a trigger associated with the potential threat; receiving an input from the user responsive to the suggestion including a selected trigger; receiving a second set of monitoring data associated with the user; responsive to detecting a second instance of the potential threat to the user based on the selected trigger and the second set of monitoring data, controlling an ambient listening function on the mobile device based on the input.

Each of the above-mentioned embodiments will be discussed in more detail below, starting with example system and device architectures of the system in which the embodiments may be practiced, followed by an illustration of processing blocks for achieving an improved technical method, device, and system for automatically activating ambient listening features automatically based on analytic trigger options.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

Referring now to the drawings, and in particular FIG. 1, an example system 100, which is configured to, among other things, automatically activating ambient listening features automatically based on analytic trigger options tailored to users'specific needs and environments. In the example illustrated, the system 100 includes a server 102, a database 104, and a console 106. As illustrated, some components of the system 100 are part of a command center 108 (for example, a campus public safety dispatch center). In other instances, the components of the system 100 may be distributed among multiple locations and communicatively coupled to one another via one or more communications networks.

The system 100 further includes a camera 110 and one or more sensors 112. The camera 110 (e.g., a digital camera having a field of view 111) is configured to record video images (also referred to herein as closed-circuit television (CCTV) images) and transmit them to the server 102, either directly or through one or more intermediate devices. By way of example, a single camera 110 is illustrated. In practice, systems may have tens or hundreds of such cameras deployed to monitor a campus.

The sensor 112 may be an occupancy sensors, a sound sensor, a movement sensor, a radar sensor, and the like. In some instances, the sensor 112 is a combination sensor including two or more of the foregoing. The sensors 112 are positioned throughout a campus environment to sense aspects of the environment including occupancy, air quality, temperature, humidity, particulate matter, light levels, spoken words (e.g., the sensor may recognize specific keywords or phrases), abnormal noise (e.g., by applying machine learning to determine baseline noise levels and durations for an area), and the like. In some instances, a sensor 112 may be a Halo Smart Sensor™, produced by Motorola Solutions®. The sensors 112 transmit their data to the server 102, either directly or through one or more intermediate devices. In some aspects, a device carried by a student (e.g., the mobile device 116 carried by the student 114) may provide sensor data to the server 102, either directly or through one or more intermediate devices.

The data from the cameras and sensors (referred to herein individually or collectively as 'monitoring data') is analyzed by the server 102, as described herein. The monitoring data may include location and other information regarding the student 114 as well as other students 118. As illustrated in FIG. 1, it is possible for the student 114 to be within a coverage area of a camera 110 (e.g., within its field of view 111) or outside of the coverage area. While outside of the coverage area, the location of the student 114 may be determined by one or more sensors 112 or from data provided by a mobile device carried by the student (e.g., the mobile device 116).

As illustrated in FIG. 1, public safety personnel 120 (carrying a two-way radio 122) may not be present near a student 114 while other students 118 are near the student 114. It should also be noted that the embodiments described herein are applicable to incident responses with more or fewer incident responders than illustrated.

As illustrated in FIG. 1, the server 102, database 104, console 106, camera 110, sensors 112, mobile device 116, and two-way radio 122, along with other devices not illustrated, are communicatively coupled to one another. For example, some or all of the foregoing may be coupled via a communications network 128. The communications network 128 is a communications network including wireless connections, wired connections, or combinations of both. The communications network 128 may be implemented using various local and wide area networks, for example, a Bluetooth™ network, a Wi-Fi network), the Internet, a land mobile radio network, a cellular data network, a Long Term Evolution (LTE) network, a 4G network, a 5G network, or combinations or derivatives thereof.

Figure 2:
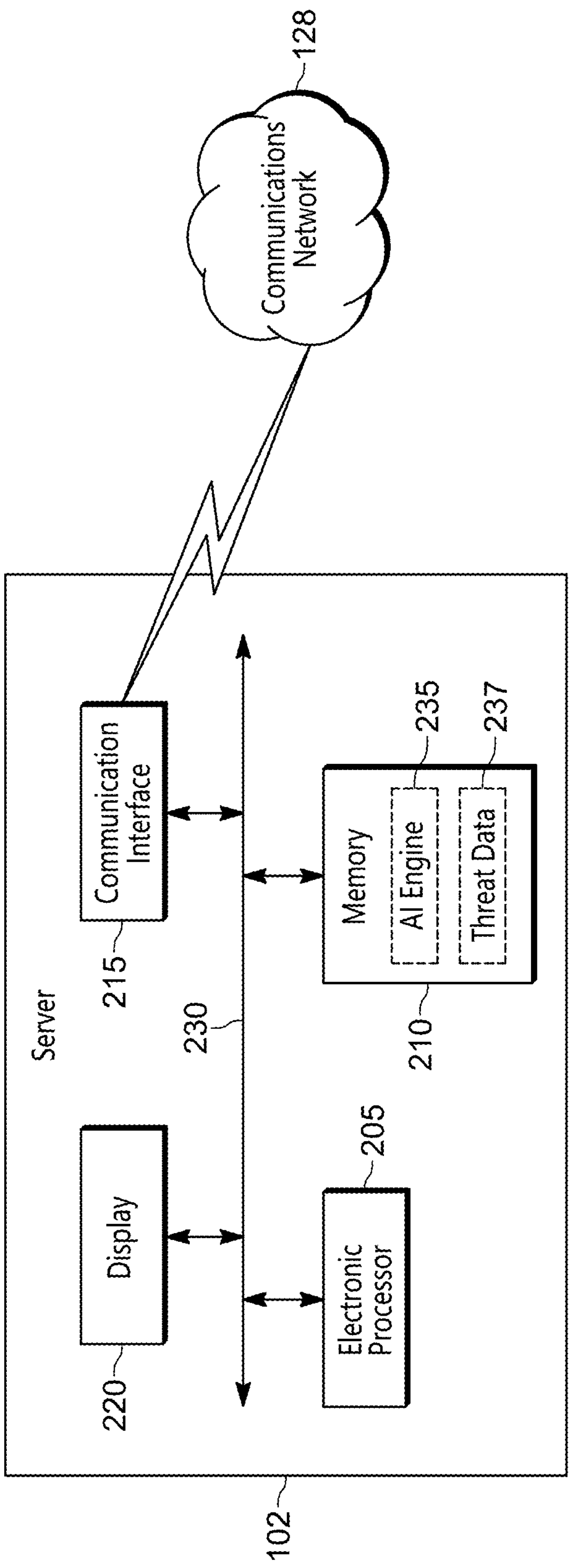
FIG. 2 is a block diagram of a server of the system of FIG. 1 according to some examples.

As described herein, the server 102 and the database 104 operate to, among other things, analyze monitoring data to automatically suggest and act on analytic trigger options tailored to students' specific needs and environments. The server 102 is described more particularly with respect to FIG. 2. In the example provided, the server 102 includes an electronic processor 205, a memory 210, a communication interface 215, and a display 220. The illustrated components, along with other various modules and components (not shown) are coupled to each other by or through one or more control or data buses (for example, a communication bus 230) that enable communication therebetween.

The electronic processor 205 obtains and provides information (for example, from the memory 210 and/or the communication interface 215) and processes the information by executing one or more software instructions or modules, capable of being stored, for example, in a random access memory ("RAM") area of the memory 210 or a read only memory ("ROM") of the memory 210 or another non-transitory computer readable medium (not shown). The software can include firmware, one or more applications, program data, filters, rules, one or more program modules, and other executable instructions. The electronic processor 205 is configured to retrieve from the memory 210 and execute, among other things, software to carry out the methods described herein.

The memory 210 can include a program storage area and a data storage area. The program storage area and the data storage area can include combinations of different types of memory, as described herein. In the embodiment illustrated, the memory 210 stores, among other things, an Artificial Intelligence (AI) Engine 235 and threat data 237.

The AI Engine 235 uses various machine learning methods to analyze monitoring data to detect potential threats and produce suggestions for analytic triggers (as described herein). Machine learning generally refers to the ability of a computer program to learn without being explicitly programmed. In some embodiments, a computer program (for example, a learning engine) is configured to construct an algorithm based on inputs. Supervised learning involves presenting a computer program with example inputs and their desired outputs. The computer program is configured to learn a general rule that maps the inputs to the outputs from the training data it receives. Example machine learning engines include decision tree learning, association rule learning, artificial neural networks, classifiers, inductive logic programming, support vector machines, clustering, Bayesian networks, reinforcement learning, representation learning, similarity and metric learning, sparse dictionary learning, and genetic algorithms. Using these approaches, a computer program can ingest, parse, and understand data and progressively refine algorithms for data analytics. The AI Engine also includes, or is configured to execute, a natural language processing (NLP) engine, which analyzes audio data received from the camera 110.

The communication interface 215 is an electronic communication interface configured to receive input and to provide system output. The communication interface 215 obtains information and signals from, and provides information and signals to, (for example, over one or more wired and/or wireless connections) devices both internal and external to the server 102. The communication interface 215 may include a wireless transmitter or transceiver for wirelessly communicating over the communications network 128. Alternatively, or in addition to a wireless transmitter or transceiver, the communication interface 215 may include a port for receiving a cable, such as an Ethernet cable, for communicating over the communications network 128 or a dedicated wired connection. It should be understood that, in some embodiments, the server 102 communicates with other devices through one or more intermediary devices, such as routers, gateways, relays, and the like.

The display 220 is a suitable display such as, for example, a liquid crystal display (LCD) touch screen, or an organic light-emitting diode (OLED) touch screen. In some embodiments, the server 102 implements a graphical user interface (GUI) (for example, generated by the electronic processor 205, from instructions and data stored in the memory 210, and presented on the display 220), that enables a user to interact with the server 102. In some embodiments, the server 102 enables display remotely, for example, using a display (configured similarly to the display 220) of the console 106.

In some embodiments, the server 102 includes a video analytics engine (for example, stored in the memory 210). A video analytics engine analyzes images (for example, images captured by the camera 110) to, among other things, identify and detect objects (including specific people) within the images, for example, by implementing one or more object classifiers. In some embodiments, the electronic processor 205 is configured to operate the video analytics engine to detect and analyze video streams to detect potential threat situations. In some examples, the video analytics engine is part of or works in concert with the AI Engine 235.

Returning to FIG. 1, the server 102 is communicatively coupled to, and writes data to and from, the database 104. In the illustrated embodiment, the database 104 is a database housed on a suitable database server communicatively coupled to and accessible by the server 102. In some instances, the database 104 is part of a cloud-based database system (for example, a data warehouse) external to the system 100 and accessible by the server 102 over one or more wired or wireless networks. In other instances, all or part of the database 104 is locally stored on the server 102.

In some examples, the server 102 and the database 104 are part of a campus-wide security software platform, such as the RAVE™ Mobile Safety Platform by Motorola Solutions®. As illustrated in FIG. 1, in some instances the database 104 electronically stores user data, threat trigger data, and monitoring data.

Examples of user data include data on students and other users of the system. User data may include contact information and identifying information, including photographs of the students. User data may also include student's academic information (e.g., class schedules). User data may also include information derived (e.g., by the AI Engine 235) about the student, such as, for example, locations where the student is expected to be at certain times based on the student's academic schedule. User data may also include incident reports involving students or other data regarding the potential for a particular student to be a threat to another student.

Threat trigger data may include data about potential threats, including examples of what constitutes a potential threat (e.g., a threshold number of unknown persons within a threshold distance of a student in excess of a threshold time). Trigger data may also include analytic triggers for students (e.g., linked to a student profile in the student data) as well as inputs received from the students, as described herein. Threat trigger data includes information pertaining to suspicious threats, potential threats, past threats, and current threat situations.

Monitoring data is the data received from the camera 110 and the sensors 112, as well as from student mobile devices and other sources.

The above delineation of data types stored in the database 104 is not intended to limit the types and quantity of data that may be stored in the database 104 or otherwise accessible to the server 102.

The console 106 is a computer terminal operated by an operator. In some aspects, the console 106 is a computer-aided dispatch terminal operated by public safety personnel to, for example, access or control functions on the server 102. In other aspects, the console 106 is a computer that includes an electronic processor (for example, a microprocessor, or other electronic controller), a memory, a network interface, and other various modules coupled directly, by one or more control or data buses, or a combination thereof. The memory may include read-only memory, random access memory, other non-transitory computer-readable media, or a combination thereof. In one example, the electronic processor is configured to retrieve instructions and data from the memory and execute, for example, functions as described herein. The console 106 sends and receives data over the communications network 128 using the network interface. While the console 106 is described herein with reference to a single operator, in some embodiments, the console 106 includes a plurality of consoles 106 that are each operated by one or more operators.

Figure 3:
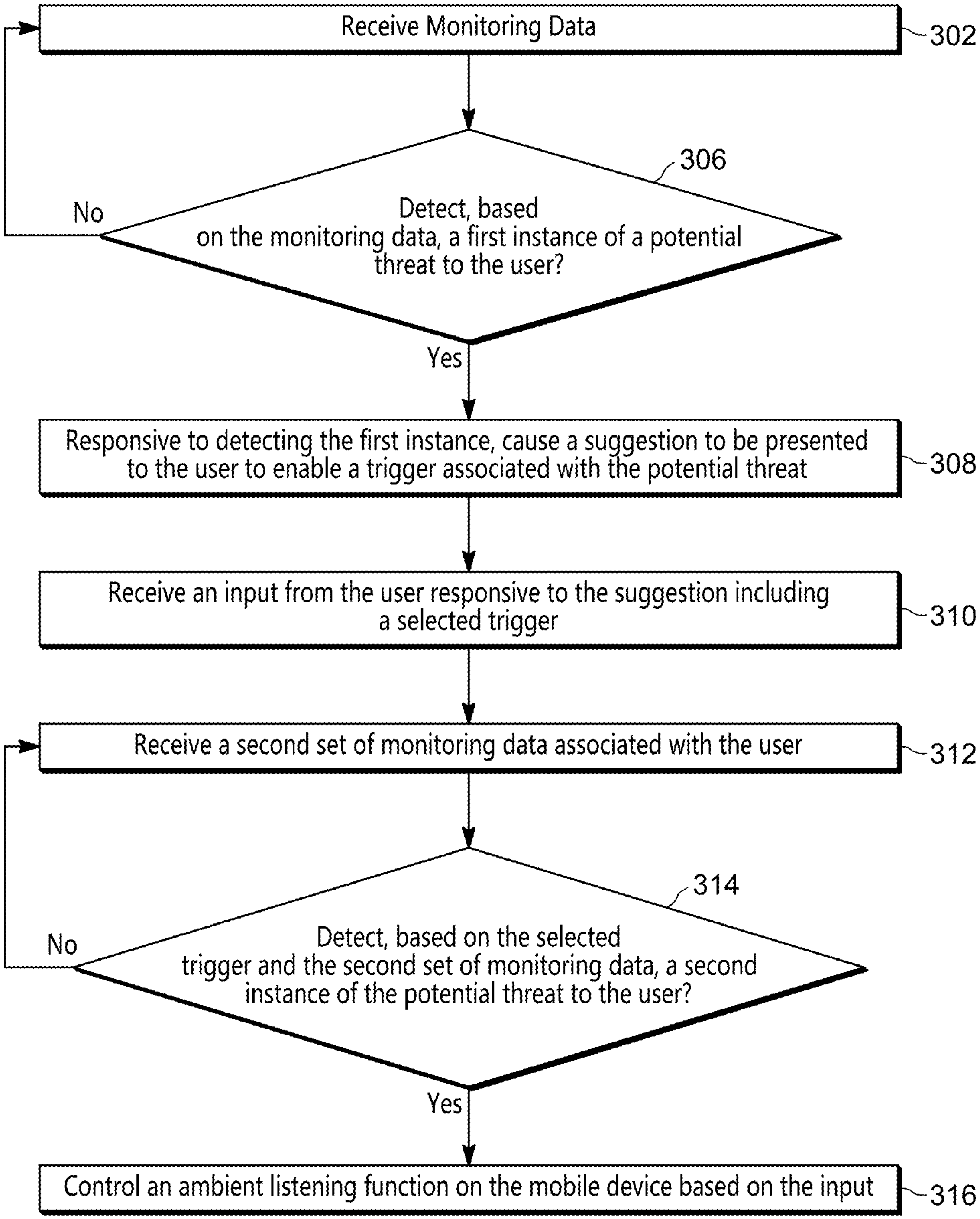
FIG. 3 is a flowchart illustrating a method for customizing triggers for automated ambient listening and evidence collection according to some examples.

FIG. 3 illustrates an example method 300 for detecting and tracking conversations of interest. Although the method 300 is described in conjunction with the system 100 as described herein, the method 300 could be used with other systems and devices. In addition, the method 300 may be modified or performed differently than the specific example provided.

As an example, the method 300 is described as being performed by a server 102 and, in particular, by the electronic processor 205. However, it should be understood that, in some embodiments, portions of the method 300 may be performed by other devices, including for example, the mobile device 116. For ease of description, the method 300 is described in terms of a single communication device. The method 300 is applicable to multiple communication devices operating together, as described herein.

At block 302, the electronic processor 205 receives a first set of monitoring data associated with a user (e.g., the student 114) of a mobile device (e.g., the mobile device 116). As noted, monitoring data may include sensor data from the mobile device, a CCTV image (e.g., an image or video stream from the camera 110), occupancy sensor data, movement sensor data, radar sensor data, sound sensor data, noise sensor data, or combinations thereof. Monitoring data may be collected continuously or periodically. The monitoring data may be pre-processed, normalized, binned, anonymized, or otherwise processed prior to analysis. Monitoring data associated with the user is data that includes images of the user or data associated with a location for the user (e.g., determined using location information for the user provided by the mobile device 116).

Figure 4:
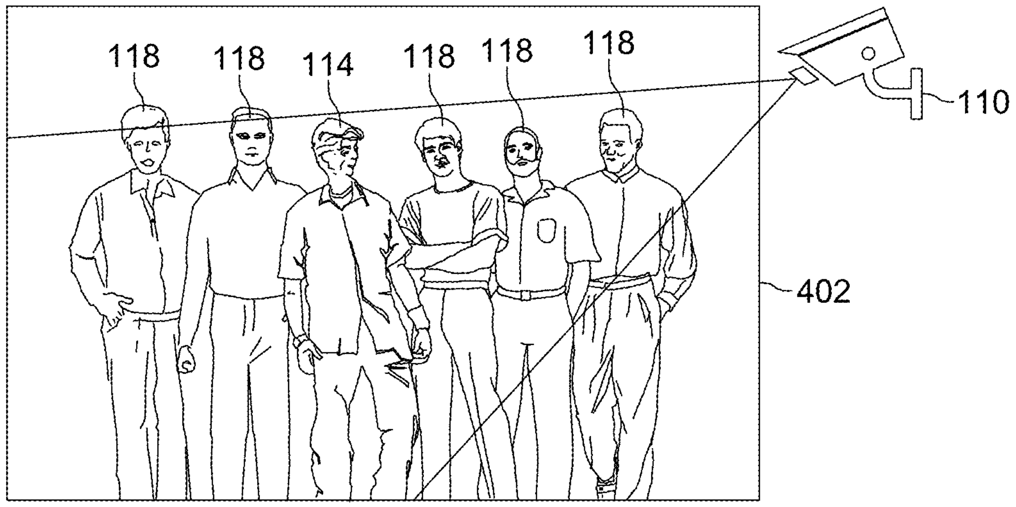
FIG. 4 is a diagram illustrating aspects of the execution of the method of FIG. 3 according to some examples.

At block 306, the electronic processor 205 detects, based on the first set of monitoring data, whether there is an instance of a potential threat to the user. For example, in some instances, the AI Engine 235 may include a model, or models trained on monitoring data representative of potential threats. In such instances, a potential threat is recognized when the AI Engine 235 recognizes a potential threat pattern in the monitoring data. For example, as illustrated in FIG. 4, the system receives a video image 402, which is analyzed to show five people 118 in close proximity to the student 114. Analysis of historical monitoring data may indicate that the student 114 does not usually congregate with the people 118 or may indicate that one or more of the people 118 have been flagged as potential troublemakers. In another example, the AI Engine 235 may be able to detect emotional indicators in the faces of the people 118 or the student 114 that indicate a potential threat.

In some instances, the AI Engine 235 detects the potential threat to the user based further on a sensitivity threshold. For example, a sensitivity threshold may be a measure of how closely the monitoring data matches a threat pattern. In some instances, the threshold may be set higher to avoid false positives. The threshold may be set based on context or location information. For example, monitoring data gathered at an athletic event may be analyzed using a higher sensitivity threshold, because it is expected that the student will be surrounded by many active people he or she does not know and gestures that may otherwise be threatening (e.g., waving fists) may be expected to occur.

In some aspects, the sensitivity threshold may also be set based on a context for the user (e.g., sourced from user profile information). For example, a user who has the history of being a victim of a bullying case will have a lower sensitivity threshold because it is expected that the user is more susceptible to being bullied again.

In some examples, the sensitivity threshold is adjusted lower based on the location of the user. For example, where a potential threat begins in the coverage area of a camera, but moves off camera, it could be inferred that those causing the threat are aware of the coverage area boundaries. Similarly, if non-video monitoring data is used to detect a potential threat and the location of the student is outside of camera coverage, the sensitivity threshold may be adjusted lower.

Where no potential threat is detected, the method 300 continues to receive and analyze monitoring data at block 302.

Figure 5:
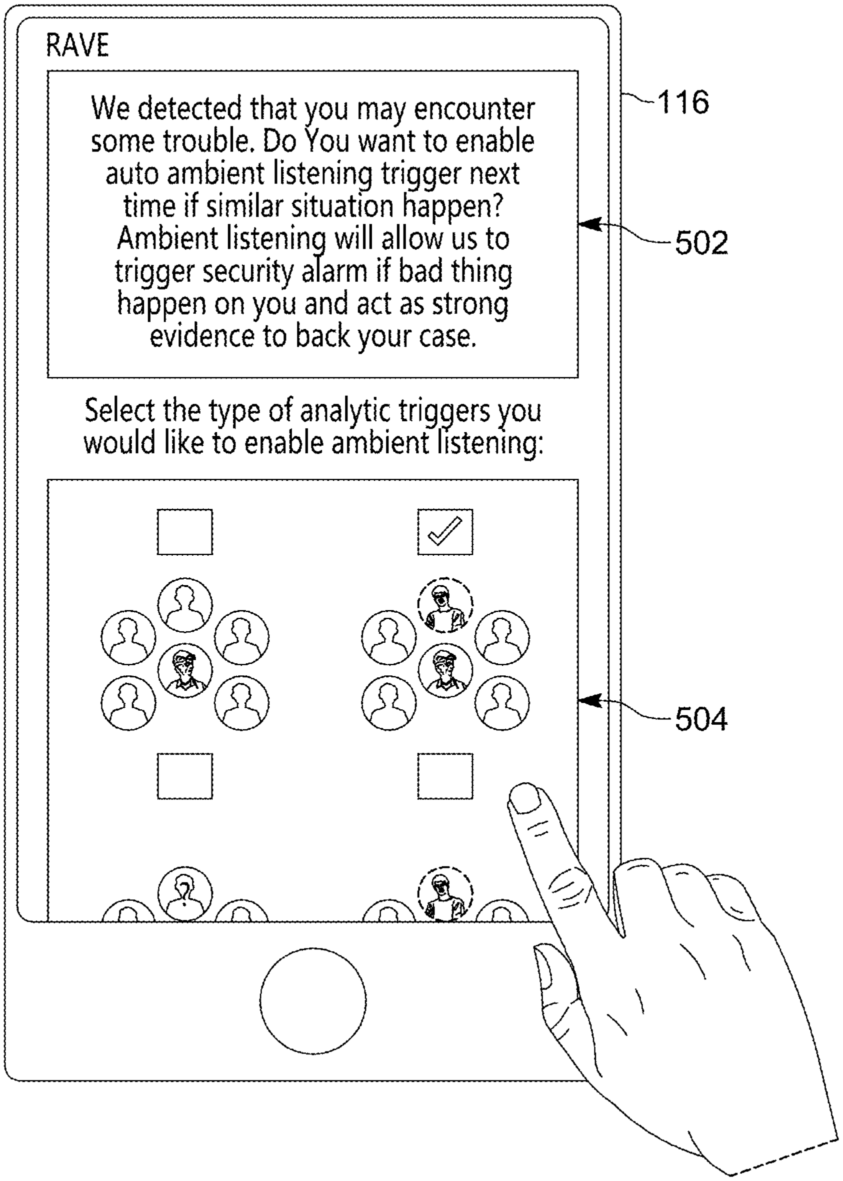
FIG. 5 illustrates an example user interface generated by the system of FIG. 1 according to some examples.

At block 308, the electronic processor 205 responsive to detecting the first instance, causes a suggestion to be presented to the user to enable a trigger associated with the potential threat. For example, as illustrated in FIG. 5, the mobile device 116 is presenting a prompt element including a suggestion 502. The suggestion 502 indicates that the system has detected a potential threat and prompts the user to indicate whether it should trigger ambient listening the next time a similar situation occurs. Presented with the suggestion 502 is a selection element 504, which allows the student to enter an input in response to the suggestion.

In some embodiments, the AI Engine 235 may, responsive to detecting the first instance of the potential threat to the user, generate at least one potential threat variation based on the potential threat. For example, where the potential threat involves a group of people surrounding the student, as noted above, the AI Engine 235 may suggest variations of that situation, which could be used to trigger ambient listening.

Figure 6:
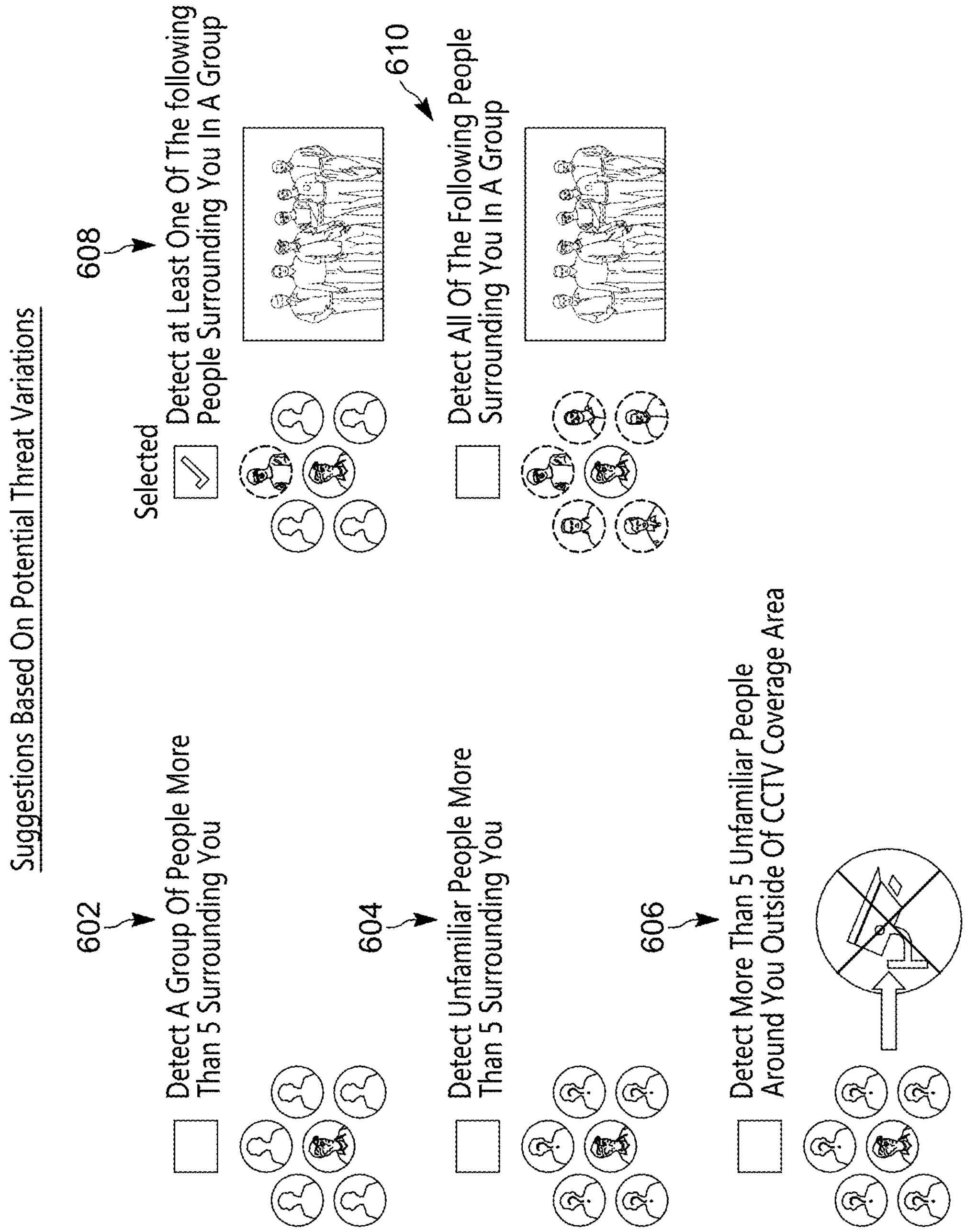
FIG. 6 illustrates an example user interface generated by the system of FIG. 1 according to some examples.

In some instances, the variations present different levels of specificity of the detected potential threat. For example, FIG. 6, illustrates an initial suggestion 602 and four variations. The initial suggestion 602, generated based on the example above (illustrated in FIG. 4), is to trigger ambient listening where a group of more than five people are surrounding the student. Variation 604 is a more specific option, to trigger ambient listening where a group of more than five unfamiliar people are surrounding the student. For example, unfamiliarity may be determined automatically by analyzing historical video of the student or by comparing the detected persons with a list of familiar persons provided to the system by the student. Variation 606 is a more specific option, to trigger ambient listening where a group of more than five unfamiliar people are surrounding the student and the student is outside of a camera coverage area. Variation 608 is a more specific option, to trigger ambient listening where at least one of a list of specific people is present in a group surrounding the student. Variation 610 is a more specific option, to trigger ambient listening where all of a list of specific people are present in a group surrounding the student. For variations 608 and 610, the specific people may be identified by the user, for example, by tapping faces of people within an image provided in the suggestion. In the example in FIG. 6, variation 608 is selected by the user by checking on the checkbox associated with variation 608.

Where multiple variations are produced, the electronic processor 205 (at block 308) causes the additional suggestions to be presented to the user.

In some instances, where there are multiple suggestions generated, the electronic processor 205 causes the suggestions to be presented to the user using a context-based priority. For example, where the image includes persons identified as known or likely troublemakers, the trigger variations based on the presence of those persons may be prioritized and thus presented to the user higher in order than variations not based on those persons. In another example, where the potential threat is detected based in part on location, the variations triggering based on location may be presented to the user higher in order than those that are not based on location.

At block 310, the electronic processor 205 receives an input from the user responsive to the suggestion, which includes a selected trigger. For example, the user may select one or more of the variations presented. The user may also reject the suggestions. In some instances, the selection or rejection of suggestions is used by the AI Engine 235 to refine its detection of potential threats for the user.

In some instances, the input from the user includes at least one customization request. For example, the user may swap out a face from the suggested trigger, may add a face photo (e.g., of someone who has been bullying them but is not yet detected in the monitoring data), edit the quantity of the surrounding people, and the like.

After receiving the user input and setting the triggers based on the input, the system continues to receive and analyze monitoring data. For example, at block 312, the electronic processor 205 receives a second set of monitoring data associated with the user. For example, this may be monitoring data received days or even weeks after that monitoring data, which generated the trigger(s).

At block 314, the electronic processor 205 detects whether a second instance of the potential threat to the user has occurred based on the second set of monitoring data, wherein the potential threat is based on user selection in block 310. For example, the AI Engine 235 may detect the potential threat using machine learning methods to match patterns in the monitoring data with the potential threats selected as triggers by the user via the user input (received at block 310). Taking FIG. 6 as example, user selected variation 608 as a trigger, thus electronic processor 205 will detect whether a second instance of potential threat occurred based on user selection, which is to detect whether there is at least one of a list of specific people present in a group surrounding the user. In some instances, the potential threat is detected based on a sensitivity threshold, as described herein. In some instances, the sensitivity threshold is adjusted lower based on a location, such as when the student is outside of camera coverage, because it is important to gather audio evidence in the absence of video evidence.

At block 316, responsive to detecting the potential threat, the electronic processor 205 controls an ambient listening function on the mobile device based on the user input. For example, where a potential threat is detected that matches a trigger selected by the user, the electronic processor 205 may send a command to the mobile device to activate its ambient listening feature. In some examples, the electronic processor may also control the mobile device to record sensor and location data for the mobile device.

In some instances, as the ambient audio is collected, the mobile device 116 transmits the ambient listening audio stream to the server 102, which receives the audio stream. In some examples, the server 102 uses natural language processing to detect, in the audio stream, one or more keywords. For example, the server 102 may look for the words 'help' or other keywords indicative of an emergency situation and, responsive to detecting the keyword, transmit an alert to a public safety agency (e.g., by alerting the public safety personnel 120 via the two-way radio 122).

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive sensor data, and cannot automatically analyze vast amounts of monitoring data, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware, and/or hardware. For example, instead of being located within and performed by a single electronic processor, logic and processing described herein may be distributed among multiple electronic processors. Similarly, one or more memory modules and communication channels or networks may be used even if embodiments described or illustrated herein have a single such device or element. Also, regardless of how they are combined or divided, hardware and software components may be located on the same computing device or may be distributed among multiple different devices. Accordingly, in this description and in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object-oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of," without a more limiting modifier such as "only one of," and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way but may also be configured in ways that are not listed.

The terms "coupled," "coupling," or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A computing device comprising:
- a memory; and
- an electronic processor coupled to the memory;
- wherein the electronic processor is configured to retrieve, from the memory, executable instructions that, when executed by the electronic processor, cause the electronic processor to:
- receive a first set of monitoring data associated with a user of a mobile device;
- detect, based on the first set of monitoring data, a first instance of a potential threat to the user;
- responsive to detecting the first instance, cause a suggestion to be presented to the user to enable a trigger associated with the potential threat;
- receive an input from the user responsive to the suggestion including a selected trigger;
- receive a second set of monitoring data associated with the user; and
- responsive to detecting a second instance of the potential threat to the user based on the selected trigger and the second set of monitoring data, control an ambient listening function on the mobile device based on the input.

2. The computing device of claim 1, wherein the executable instructions further cause the electronic processor to detect the first instance of the potential threat to the user based further on a first sensitivity threshold.

3. The computing device of claim 2, wherein the executable instructions further cause the electronic processor to adjust the first sensitivity threshold based on at least one of a location of the user and a context for the user.

4. The computing device of claim 1, wherein the executable instructions further cause the electronic processor to:
- responsive to detecting a second instance of the potential threat to the user based on the second set of monitoring data, control the mobile device to, based on the input, record sensor and location data for the mobile device.

5. The computing device of claim 4, wherein the executable instructions further cause the electronic processor to detect the second instance of the potential threat to the user based further on a second sensitivity threshold.

6. The computing device of claim 5, wherein the executable instructions further cause the electronic processor to adjust the second sensitivity threshold based on a location of the user.

7. The computing device of claim 1, wherein the input from the user includes at least one customization request.

8. The computing device of claim 1, wherein the executable instructions further cause the electronic processor to:
- responsive to detecting the first instance of the potential threat to the user, generate at least one potential threat variation based on the potential threat; and
- cause at least one additional suggestion to be presented to the user to enable at least one additional trigger associated with the at least one potential threat variation.

9. The computing device of claim 8, wherein the executable instructions further cause the electronic processor to cause the suggestion and the at least one additional suggestion to be presented to the user using a context-based priority.

10. The computing device of claim 1, wherein the executable instructions further cause the electronic processor to:
- receive an audio stream produced by ambient listening function;
- detect, in the audio stream, a keyword; and
- responsive to detecting the keyword, transmit an alert to a public safety agency.

11. The computing device of claim 1, wherein the first set of monitoring data includes one selected from a group consisting of sensor data from the mobile device, a CCTV image, occupancy sensor data, movement sensor data, and radar sensor data.

12. A method comprising:
- receiving a first set of monitoring data associated with a user of a mobile device;
- detecting, based on the first set of monitoring data, a first instance of a potential threat to the user;
- responsive to detecting the first instance, presenting a suggestion to the user to enable a trigger associated with the potential threat;
- receiving an input from the user responsive to the suggestion including a selected trigger;
- receiving a second set of monitoring data associated with the user; and
- responsive to detecting a second instance of the potential threat to the user based on the selected trigger and the second set of monitoring data, controlling an ambient listening function on the mobile device based on the input.

13. The method of claim 12, further comprising:

detecting the first instance of the potential threat to the user based further on a first sensitivity threshold.

14. The method of claim 13, further comprising:

adjusting the first sensitivity threshold based on a location of the user.

15. The method of claim 12, further comprising:

responsive to detecting a second instance of the potential threat to the user based on the second set of monitoring data, controlling the mobile device to, based on the input, record sensor and location data for the mobile device.

16. The method of claim 15, further comprising:

detecting the second instance of the potential threat to the user based further on a second sensitivity threshold.

17. The method of claim 16, further comprising:

adjust the second sensitivity threshold based on at least of a location of the user and a context for the user.

18. The method of claim 12, wherein the input from the user includes at least one customization request.

19. The method of claim 12, further comprising:

responsive to detecting the first instance of the potential threat to the user, generating at least one potential threat variation based on the potential threat; and causing at least one additional suggestion to be presented to the user to enable at least one additional trigger associated with the at least one potential threat variation.

20. The method of claim 19, further comprising:

presenting the suggestion and the at least one additional suggestion to the user using a context-based priority.

* * * * *